United States Patent
Liu et al.

(10) Patent No.: US 9,451,602 B2
(45) Date of Patent: Sep. 20, 2016

(54) CSI-RS TRANSMISSION METHOD AND DETECTION METHOD AND APPARATUSES THEREOF

(75) Inventors: Jianjun Liu, Beijing (CN); Qixing Wang, Beijing (CN); Zhihua Shi, Beijing (CN); Chengkang Pan, Beijing (CN); Xiaodong Xu, Beijing (CN); Guangyi Liu, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 390 days.

(21) Appl. No.: 13/810,207

(22) PCT Filed: Jul. 4, 2011

(86) PCT No.: PCT/CN2011/076802
§ 371 (c)(1),
(2), (4) Date: Jan. 15, 2013

(87) PCT Pub. No.: WO2012/006931
PCT Pub. Date: Jan. 19, 2012

(65) Prior Publication Data
US 2013/0114560 A1 May 9, 2013

(30) Foreign Application Priority Data
Jul. 15, 2010 (CN) .......................... 2010 1 0232079

(51) Int. Cl.
*H04W 72/04* (2009.01)
*H04L 1/00* (2006.01)
*H04W 72/12* (2009.01)

(52) U.S. Cl.
CPC .......... *H04W 72/042* (2013.01); *H04L 1/0026* (2013.01); *H04L 1/0027* (2013.01); *H04W 72/1273* (2013.01)

(58) Field of Classification Search
CPC ............ H04B 1/00; H04B 1/44; H04B 1/50; H04B 1/56; H04B 1/406; H04B 7/0417; H04B 7/0669; H04B 7/2656; H04L 1/0003; H04L 1/06; H04L 1/0009; H04L 1/0071; H04L 1/0618; H04L 5/0007; H04L 12/2697; H04L 25/0204; H04L 27/0008; H04L 29/06; H04L 43/00; H04L 43/50; H04L 43/0852; H04L 47/10; H04W 4/02; H04W 16/14; H04W 16/10; H04W 24/00; H04W 28/04; H04W 28/16; H04W 28/18; H04W 28/24; H04W 72/04; H04W 72/042; H04W 72/085; H04W 72/0446; H04W 76/02; H04W 80/04; H04W 84/18; H04W 88/02; H04W 88/06; H04W 88/08; H04W 92/02
USPC ........................ 370/252, 277, 280, 328, 329; 455/422.1, 450, 452.2; 375/267, 295
See application file for complete search history.

(56) References Cited

U.S. PATENT DOCUMENTS

2010/0027447 A1* 2/2010 Choi et al. ..................... 370/280
2010/0118706 A1* 5/2010 Parkvall et al. ............... 370/241
(Continued)

FOREIGN PATENT DOCUMENTS

CN   101541085 A   9/2009
CN   101610607 A   12/2009
(Continued)

OTHER PUBLICATIONS

3GPP TSG RAN WG1 meeting #61, R1-103100, Montreal, Canada, May 10-14, 2010, 15 pages.
(Continued)

*Primary Examiner* — Marsha D Banks Harold
*Assistant Examiner* — Dharmesh Patel
(74) *Attorney, Agent, or Firm* — Kilpatrick Townsend & Stockton LLP (57) ABSTRACT

Disclosed in embodiments of the present invention are a CSI-RS transmission method, an inspection method and a device thereof. The transmission method comprises: transmitting a CSI-RS via any downlink subframe other than a special subframe, a downlink subframe transmitting a control message, or a downlink subframe transmitting a system message. Embodiments of the present invention enable the CSI-RS to be prevented from conflicting with the control message, the system message, and a message carried by the special subframe.

12 Claims, 3 Drawing Sheets

(56) References Cited

U.S. PATENT DOCUMENTS

2010/0254471 A1* 10/2010 Ko et al. .................. 375/260
2010/0272037 A1* 10/2010 Lee et al. .................. 370/329
2010/0323684 A1* 12/2010 Cai et al. .................. 455/422.1
2011/0199986 A1* 8/2011 Fong et al. .................. 370/329

FOREIGN PATENT DOCUMENTS

CN 101635950 A 1/2010
WO WO 2010052566 A2 * 5/2010

OTHER PUBLICATIONS

3GPP TSG RAN WG1 Meeting #61bis, R1-103483, Dresden, Germany, Jun. 28-Jul. 2, 2010, 5 pages.

3GPP TSG-RAN WG1 #61bis, R1-103545, Jun. 28-Jul. 2, 2010, Dresden, Germany, 8 pages.

* cited by examiner

CSI-RS TRANSMISSION METHOD AND DETECTION METHOD AND APPARATUSES THEREOF

This application is a U.S. National Stage of International Application No. PCT/CN2011/076802, filed on Jul. 4, 2011, which claims priority to Chinese Application No. 201010232079.2, filed on Jul. 15, 2010, all of which are incorporated herein by reference in their entireties.

FIELD OF THE INVENTION

The present invention relates to the field of communications and particularly to a CSI-RS transmission method and detection method and apparatuses thereof.

BACKGROUND OF THE INVENTION

A Reference Signal (RS) plays an increasingly important role in a communication network along with the development of the communication network. The RS, also referred to as a pilot signal, is a known signal provided from a transmitter to a receiver to estimate a channel or to probe a channel. Pilot signals in the Long Term Evolution Release 8 (LTE R8) include a Common Reference Signal (CRS) and a UE-specific Reference Signal (DRS).

As continuous evolution of the LTE R8 system, the Long Term Evolution-Advanced (LTE-Advanced) system shall define for a user a Demodulation Reference Signal (DMRS) supporting 8-layer transmission to demodulate a data symbol in a Physical Downlink Shared Channel (PDSCH). Also in order to support detection of a Channel Quality Indicator (CQI) in a 8-Tx antenna configuration for high-order Multiple Input Multiple Output (MIMO), the LTE-Advanced system shall further define a new reference (pilot) signal, a CSI RS, for the LTE-Advanced user to measure downlink Channel State Information (CSI) and the CSI-RS is cell-specific and functionally similar to the CRS in the LTE R8 and shall support at most 8 logic ports (i.e., 8 CSI-RS ports).

The inventors have identified during making of the invention at least the following drawbacks in the prior art:

In the prior art, a specific design for a CSI-RS pattern has not yet been defined and a specific solution to how to transmit CSI-RS has been absent so far.

SUMMARY OF THE INVENTION

Embodiments of the invention provide a CSI-RS transmission method and detection method and apparatuses thereof to determine a CSI-RS transmission scheme in order to avoid conflict with other information transmitted in a downlink subframe.

In order to achieve the foregoing object, an embodiment of the invention proposes a CSI-RS transmission method including:

transmitting CSI-RS in a downlink subframe other than special subframes, downlink subframes for transmitting control information and downlink subframes for transmitting system information.

Preferably, the downlink subframes for transmitting control information comprise a downlink subframe for transmitting synchronization sequence, a downlink subframe configured to Physical Broadcast Channel, PBCH, and a downlink subframe configured to paging channel, PCH; and the downlink subframes for transmitting system information comprise a downlink subframe for transmitting System Information Block, SIB-1.

A CSI-RS transmission method includes:

transmitting CSI-RS in subframe 4 and subframe 9 in the case of any of uplink-downlink configurations 1, 2, 4 and 5 when CSI-RS transmission cycle is 5 ms; and transmitting the CSI-RS in subframe 9 in the case of any of uplink-downlink configurations 1, 2, 3, 4, 5 and 6 when the CSI-RS transmission cycle is 10 ms.

A CSI-RS transmission apparatus includes:

a transmission module configured to transmit CSI-RS in a downlink subframe other than special subframes, downlink subframes for transmitting control information and downlink subframes for transmitting system information.

A CSI-RS transmission apparatus includes:

a transmission module configured to transmit CSI-RS in subframe 4 and subframe 9 in the case of any of uplink-downlink configurations 1, 2, 4 and 5 when CSI-RS transmission cycle is 5 ms; and to transmit the CSI-RS in subframe 9 in the case of any of uplink-downlink configurations 1, 2, 3, 4, 5 and 6 when the CSI-RS transmission cycle is 10 ms.

A CSI-RS detection method includes:

detecting CSI-RS in a downlink subframe other than special subframes, downlink subframes for transmitting control information and downlink subframes for transmitting system information.

A CSI-RS detection method includes:

detecting CSI-RS in subframe 4 and subframe 9 in the case of any of uplink-downlink configurations 1, 2, 4 and 5 when a detection cycle of the CSI-RS is 5 ms; and detecting the CSI-RS in subframe 9 in the case of any of uplink-downlink configurations 1, 2, 3, 4, 5 and 6 when CSI-RS detection cycle is 10 ms.

A CSI-RS detection apparatus includes:

a detection module configured to detect CSI-RS in a downlink subframe other than special subframes, downlink subframes for transmitting control information and downlink subframes for transmitting system information.

A CSI-RS detection apparatus includes:

a detection module configured to detect CSI-RS in subframe 4 and subframe 9 in the case of any of uplink-downlink configurations 1, 2, 4 and 5 when a detection cycle of the CSI-RS is 5 ms; and to detect the CSI-RS in subframe 9 in the case of any of uplink-downlink configurations 1, 2, 3, 4, 5 and 6 when CSI-RS detection cycle is 10 ms.

The embodiments of the invention have the following advantages over the prior art: the embodiments of the invention avoid conflict of CSI-RS with control information, system information and information borne in a special subframe; and the CSI-RS is transmitted in a downlink subframe at a fixed location to thereby save signaling overhead, simplify scheduling of the CSI-RS subframe and lower implementation complexity in hardware.

DETAILED DESCRIPTION OF THE EMBODIMENTS

Technical solutions of embodiments of the invention will be clearly and fully described below in connection with the drawings in the embodiments of the invention, and apparently the embodiments to be described are a part but not all of the embodiments of the invention. All the other embodiments which can be derived from the embodiments here in the invention by those ordinarily skilled in the art without any inventive effort shall fall into the claimed scope of the invention.

Since a Release 8 User Equipment (R8 UE) cannot identify CSI-RS defined for a Release 10 User Equipment (R10 UE), the throughput performance of the R8 UE may be degraded due to CSI-RS inserted in a Downlink (DL) Subframe. Thus the number of downlink subframes for transmitting CSI-RS shall be reduced to a number as small as possible in order to minimize the influence of CSI-RS transmission on the performance of the R8 UE.

Furthermore an overhead of a CSI-RS has been standardized as a Resource Element (RE)/a port/a Physical Resource Block (PRB), but a specific design for a CSI-RS pattern has not yet been defined. Thus CSI-RS for 8 antenna ports of the same cell can be transmitted collectively in the same downlink subframe, that is, the same PRB is designed to include CSI-RS patterns for the 8 ports instead of distributing the CSI-RS for the 8 ports in a plurality of subframes for transmission.

Moreover CSI-RS transmission cycle has been standardized as a multiple of 5 ms, e.g., 5 ms, 10 ms, etc., and can be network-configured. In order to reduce the number of downlink subframes for transmitting CSI-RS to a number as small as possible, each cell can be configured to transmit CSI-RS to a UE in only one available downlink subframe and transmit the CSI-RS in the downlink subframe with a fixed location (i.e., a subframe number) in one CSI-RS cycle.

In a Time Division Duplex (TDD) system, the number of downlink subframes is limited by an uplink-downlink configuration, and the ratio of configured TDD uplink to downlink is specified in the Third Generation Partnership (3GPP) protocol 36.211 as depicted in Table 1.

configured special subframe (corresponding to the TDD subframe 1 and subframe 6 in the case of an 5 ms downlink-to-uplink switch-point periodicity and to the TDD subframe 1 in the case of an 10 ms downlink-to-uplink switch-point periodicity). The UL-DL configuration 0 corresponds to the smallest number (2) of downlink subframes, and the UL-DL configuration 5 corresponds to the largest number (8) of downlink subframes. The number of special subframes S can be configured as 1 (the configurations 3/4/5) or 2 (the configurations 0/1/2/6) per 10 ms.

In the TDD system, a special subframe S can include a Downlink Pilot Time Slot (DwPTS)/a Guard Period (GP)/an Uplink Pilot Time Slot (UpPTS), where the DwPTS is used for transmitting DMRS of Release 9 (R9)/R10 UEs, and Primary Synchronous Signal (PSS) is transmitted in a third Orthogonal Frequency Division Multiplexing (OFDM), but CSI-RS shall not conflict with a synchronous channel and a DMRS resource. Thus there is no sufficient space in the special subframe to transmit CSI-RS, and an overhead of CSI-RS may be too large in the special subframe if the RS is inserted into the DwPTS. Thus CSI-RS shall not be transmitted in any special subframe but shall be transmitted in at least one downlink subframe. Since different numbers of downlink subframes are configured in different UL-DL configurations, downlink subframe for transmitting CSI-RS may be restricted by a configuration condition, and downlink subframe for transmitting CSI-RS shall be determined respectively for the different UL-DL configurations.

Furthermore conflict between CSI-RS and control channel resources shall further be avoided in selecting a downlink subframe for transmitting the CSI-RS, where the control channel resources includes Physical Broadcast Channel (PBCH), PSS, Secondary Synchronous Signal (SSS), Paging Channel (PCH) and system information SIB-1.

Particularly the PBCH is located at the first 4 OFDM symbols of the slot 1 of subframe 0 in a TDD radio frame and occupies central 72 sub-carriers (6 RBs) of a system bandwidth while precluding an RE occupied for a CRS. Thus subframe 0 of each radio frame shall be obviated in transmitting CSI-RS throughout the frequency band in order to avoid conflict between the CSI-RS and the PBCH.

In the TDD system, the PSS is mapped to the third OFDM symbols of DwPTSs of subframe 1 and subframe 6 (special subframes); and the SSS is distributed to the last OFDM symbols of the slot 1 and the slot 11, i.e., the last OFDM symbols of subframe 0 and subframe 5. The PSS/SSS are mapped onto 6 consecutive PRBs centered in the bandwidth at the locations of the OFDM symbols determined as above,

TABLE 1

Table of uplink-downlink configurations in TDD system

| UL-DL (uplink-downlink) configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Where D represents a configured downlink subframe, U represents a configured uplink subframe, and S represents a and since both the lengths of PSS/SSS sequences are 62, they are mapped onto 62 carriers at the middle of the 6 PRBs centered at the symbols where they are located, and 5 sub-carriers are reserved respectively at both sides in the frequency domain. Thus subframe 0 shall be obviated in transmitting CSI-RS throughout the frequency band in order to avoid conflict between the CSI-RS and the SSS; and 2 special subframes are configured in a radio frame in the case of 5 ms downlink-to-uplink switch-point periodicity, and CSI-RS shall obviate subframe 5 (at least the last OFDM symbol of subframe 5) in order to avoid conflict with the SSS.

As specified in the 3GPP 36.304/36.331 protocols, a cycle of the PCH can be 32, 64, 128 or 256 radio frames (i.e., 320, 640, 1280 or 2560 subframes), and a paging subframe is uniquely determined for each UE in a paging radio frame cycle, and this paging subframe may correspond to one of subframe 0, subframe 1, subframe 5 and subframe 6. Thus, the paging subframe configured to a paging channel, i.e., subframe 0, subframe 1, subframe 5 and subframe 6, shall be obviated in transmitting CSI-RS throughout the frequency band in order to avoid conflict with the PCH.

As further specified in the 36.331 protocol, system information include a Master Information Block (MIB) and a plurality of System Information Blocks (SIBs), where SIB-1 is applied to fixed scheduling at a cycle of 80 ms and a retransmission scheme in a period of 80 ms. The SIB-1 is initially transmitted in subframe 5 of a radio frame with a System Frame Number (SFN) satisfying SFN mod 8=0 and also retransmitted in subframes 5 of all the other radio frames satisfying SFN mod 2=0. Since the SIB-1 is transmitted in subframe 5 and resource is dynamically scheduled, CSI-RS shall obviate subframe 5 of a radio frame satisfying SFN mod 2=0 in order to avoid conflict with the SIB-1.

Furthermore in the TDD system, downlink subframe resource for transmitting CSI-RS also varies with different UL-DL configurations. Downlink subframes which can be used for transmitting CSI-RS include subframe 4 and subframe 9 in the UL-DL configuration 1, subframe 3, subframe 4, subframe 8 and subframe 9 in the UL-DL configuration 2, subframe 7, subframe 8 and subframe 9 in the UL-DL configuration 3, subframe 4, subframe 7, subframe 8 and subframe 9 in the UL-DL configuration 4, subframe 3, subframe 4, subframe 7, subframe 8 and subframe 9 in the UL-DL configuration 5, and subframe 9 in the UL-DL configuration 6; and whether subframes 6 in the UL-DL configuration 3, the UL-DL configuration 4 and the UL-DL configuration 5 can be used for transmitting CSI-RS depends upon a configured paging subframe, and subframe 6 can be used for transmitting CSI-RS if it is not configured to a paging subframe.

Specifically a subframe which can be used for transmitting CSI-RS in a different UL-DL configuration can be described as follows:

(1) UL-DL configuration 0: Since there are only 2 downlink subframes distributed in subframe 0 and subframe 5, there is no sufficient resource to transmit CSI-RS. Even if CSI-RS is transmitted in this configuration, it can only be transmitted in subframe 5 under constrained scheduling to avoid conflict of the CSI-RS with a control channel.

(2) UL-DL configuration 1: CSI-RS can be transmitted in subframe 4 and subframe 9.

(3) UL-DL configuration 2: CSI-RS can be transmitted in subframe 3, subframe 4, subframe 8 and subframe 9.

(4) UL-DL configuration 3: CSI-RS can be transmitted in subframe 7, subframe 8 and subframe 9 if subframe 6 is configured to a paging channel; or CSI-RS can be transmitted in subframe 6, subframe 7, subframe 8 and subframe 9 if subframe 6 is not configured to a paging channel.

(5) UL-DL configuration 4: CSI-RS can be transmitted in subframe 4, subframe 7, subframe 8 and subframe 9 if subframe 6 is configured to a paging channel; or CSI-RS can be transmitted in subframe 4, subframe 6, subframe 7, subframe 8 and subframe 9 if subframe 6 is not configured to a paging channel.

(6) UL-DL configuration 5: CSI-RS can be transmitted in subframe 3, subframe 4, subframe 7, subframe 8 and subframe 9 if subframe 6 is configured to a paging channel; or CSI-RS can be transmitted in subframe 3, subframe 4, subframe 6, subframe 7, subframe 8 and subframe 9 if subframe 6 is not configured to a paging channel.

(7) UL-DL configuration 6: CSI-RS can be transmitted in subframe 9.

As can be determined under the foregoing principle, the UL-DL configurations 1 to 6 can support CSI-RS transmission cycle of 10 ms and transmit CSI-RS in subframe 9; and the UL-DL configurations 1, 2, 4 and 5 can support CSI-RS transmission cycle of 5 ms and transmit CSI-RS in subframe 4 and subframe 9.

Figure 1:
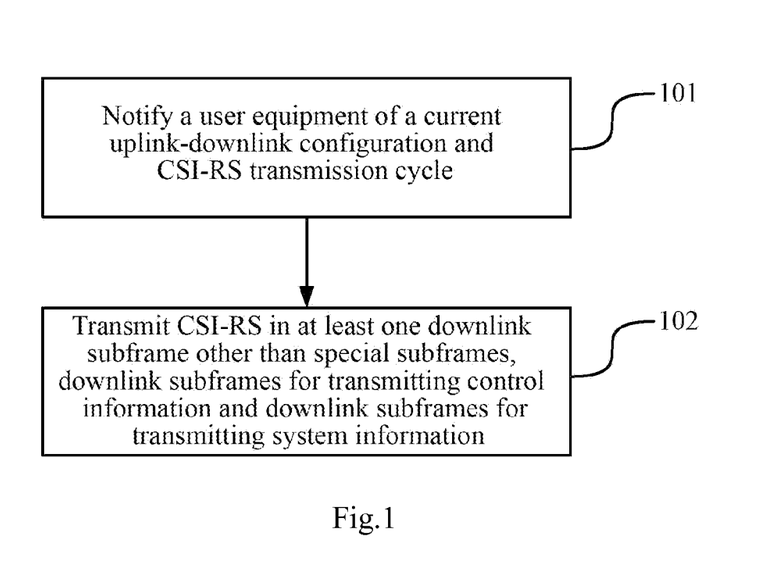
FIG. 1 is a flow chart of a CSI-RS transmission method in a first embodiment of the invention.

As illustrated in FIG. 1 which is a flow chart of a CSI-RS transmission method in a first embodiment of the invention, the method includes the following steps:

The step 101 is to notify a user equipment of a current uplink-downlink configuration and CSI-RS transmission cycle.

Particularly the current uplink-downlink configuration and the CSI-RS transmission cycle are configured semi-statically and configuration cycle thereof is longer than the CSI-RS transmission cycle. For example, the CSI-RS transmission cycle is typically 10 ms or 5 ms, and the configuration cycle of the uplink-downlink configuration can be 80 ms.

It shall be noted that this step is a preferred step of the embodiment of the invention, and the current uplink-downlink configuration and the CSI-RS transmission cycle may not be notified when the CSI-RS transmission cycle and the current uplink-downlink configuration are fixed.

The step 102 is to transmit CSI-RS in at least one downlink subframe other than special subframes, downlink subframes for transmitting control information and downlink subframes for transmitting system information.

Particularly the downlink subframes for transmitting control information can include a downlink subframe for transmitting a synchronization sequence, a downlink subframe configured to a PBCH and a downlink subframe configured to a PCH; and the downlink subframes for transmitting system information can include a downlink subframe for transmitting SIB-1.

Specifically the CSI-RS is transmitted in subframe 4 and/or subframe 9 in the case of uplink-downlink configuration 1.

The CSI-RS is transmitted in at least one of subframe 3, subframe 4, subframe 8 and subframe 9 in the case of uplink-downlink configuration 2.

The CSI-RS is transmitted in at least one of subframe 7, subframe 8 and subframe 9 if subframe 6 is configured to the PCH; or the CSI-RS is transmitted in at least one of subframe 6, subframe 7, subframe 8 and subframe 9 if subframe 6 is not configured to the PCH, in the case of uplink-downlink configuration 3.

The CSI-RS is transmitted in at least one of subframe 4, subframe 7, subframe 8 and subframe 9 if subframe 6 is configured to the PCH; or the CSI-RS is transmitted in at least one of subframe 4, subframe 6, subframe 7, subframe 8 and subframe 9 if subframe 6 is not configured to the PCH, in the case of uplink-downlink configuration 4.

The CSI-RS is transmitted in at least one of subframe 3, subframe 4, subframe 7, subframe 8 and subframe 9 if subframe 6 is configured to the PCH; or the CSI-RS is transmitted in at least one of subframe 3, subframe 4, subframe 6, subframe 7, subframe 8 and subframe 9 if subframe 6 is not configured to the PCH, in the case of uplink-downlink configuration 5.

The CSI-RS is transmitted in subframe 9 in the case of uplink-downlink configuration 6.

Preferably the CSI-RS can alternatively be transmitted in the following way:

The CSI-RS is transmitted in subframe 4 and subframe 9 in the case of any of uplink-downlink configurations 1, 2, 4 and 5 when CSI-RS transmission cycle is 5 ms; and The CSI-RS is transmitted in subframe 9 in the case of any of uplink-downlink configurations 1, 2, 3, 4, 5 and 6 when CSI-RS transmission cycle is 10 ms.

The embodiment of the invention avoids conflict of CSI-RS with control information, system information and information borne in a special subframe; and the CSI-RS is transmitted in downlink subframe at a fixed location to thereby save signaling overhead, simplify scheduling of the CSI-RS subframe and lower implementation complexity in hardware.

Figure 2:
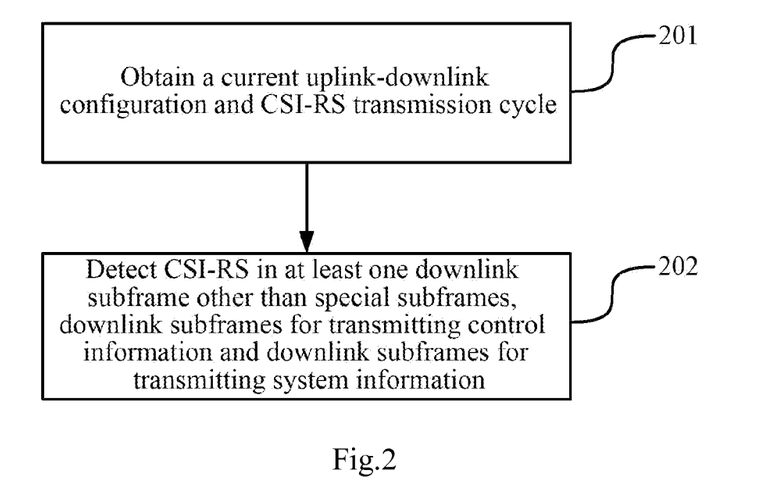
FIG. 2 is a flow chart of a CSI-RS detection method in a second embodiment of the invention.

As illustrated in FIG. 2 which is a flow chart of a CSI-RS detection method in a second embodiment of the invention, the method includes the following steps:

The step 201 is to obtain a current uplink-downlink configuration and CSI-RS transmission cycle.

Particularly the current uplink-downlink configuration and the CSI-RS transmission cycle are configured semi-statically and configuration cycle thereof is longer than the CSI-RS transmission cycle. For example, the CSI-RS transmission cycle is typically 10 ms or 5 ms, and the configuration cycle of the uplink-downlink configuration can be 80 ms.

It shall be noted that this step is a preferred step of the embodiment of the invention, and the current uplink-downlink configuration and the CSI-RS transmission cycle may not be obtained when the CSI-RS transmission cycle and the current uplink-downlink configuration are fixed.

The step 202 is to detect CSI-RS in a downlink subframe other than special subframes, downlink subframes for transmitting control information and downlink subframes for transmitting system information.

Particularly the downlink subframes for transmitting control information can include a downlink subframe for transmitting synchronization sequence, a downlink subframe configured to PBCH and a downlink subframe configured to PCH; and the downlink subframes for transmitting system information can include a downlink subframe for transmitting SIB-1.

Specifically the CSI-RS is detected in subframe 4 and/or subframe 9 in the case of uplink-downlink configuration 1.

The CSI-RS is detected in at least one of subframe 3, subframe 4, subframe 8 and subframe 9 in the case of uplink-downlink configuration 2.

The CSI-RS is detected in at least one of subframe 7, subframe 8 and subframe 9 if subframe 6 is configured to the PCH; or the CSI-RS is detected in at least one of subframe 6, subframe 7, subframe 8 and subframe 9 if subframe 6 is not configured to the PCH, in the case of uplink-downlink configuration 3.

The CSI-RS is detected in at least one of subframe 4, subframe 7, subframe 8 and subframe 9 if subframe 6 is configured to the PCH; or the CSI-RS is detected in at least one of subframe 4, subframe 6, subframe 7, subframe 8 and subframe 9 if subframe 6 is not configured to the PCH, in the case of uplink-downlink configuration 4.

The CSI-RS is detected in at least one of subframe 3, subframe 4, subframe 7, subframe 8 and subframe 9 if subframe 6 is configured to the PCH; or the CSI-RS is detected in at least one of subframe 3, subframe 4, subframe 6, subframe 7, subframe 8 and subframe 9 if subframe 6 is not configured to the PCH, in the case of uplink-downlink configuration 5.

The CSI-RS is detected in subframe 9 in the case of uplink-downlink configuration 6.

Preferably the CSI-RS can alternatively be detected in the following way:

The CSI-RS is detected in subframe 4 and subframe 9 in the case of any of uplink-downlink configurations 1, 2, 4 and 5 when CSI-RS transmission cycle is 5 ms; and the CSI-RS is detected in subframe 9 in the case of any of uplink-downlink configurations 1, 2, 3, 4, 5 and 6 when CSI-RS transmission cycle is 10 ms.

The embodiment of the invention avoids conflict of CSI-RS with control information, system information and information borne in a special subframe; and the CSI-RS is detected in downlink subframe at a fixed location to thereby save signaling overhead, simplify scheduling of the CSI-RS subframe and lower implementation complexity in hardware.

The embodiment of the invention provides the CSI-RS transmission method in the foregoing implementation, and correspondingly an embodiment of the invention further provides an apparatus to which the foregoing CSI-RS transmission method is applied.

Figure 3:
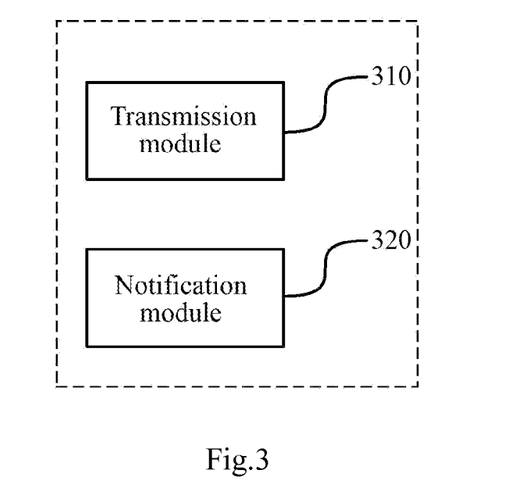
FIG. 3 is a schematic structural diagram of a CSI-RS transmission apparatus in a third embodiment of the invention.

As illustrated in FIG. 3 which is a schematic structural diagram of a CSI-RS transmission apparatus in a third embodiment of the invention, the apparatus includes:

A transmission module 310 configured to transmit CSI-RS in a downlink subframe other than special subframes, downlink subframes for transmitting control information and downlink subframes for transmitting system information.

Particularly the downlink subframes for transmitting control information can include a downlink subframe for transmitting a synchronization sequence, a downlink subframe configured to a PBCH and a downlink subframe configured to a PCH; and the downlink subframes for transmitting system information can include a downlink subframe for transmitting SIB-1.

Specifically the transmission module 310 is configured to transmit the CSI-RS in subframe 4 and/or subframe 9 in the case of uplink-downlink configurations 1;

To transmit the CSI-RS in at least one of subframe 3, subframe 4, subframe 8 and subframe 9 in the case of uplink-downlink configuration 2;

To transmit the CSI-RS in at least one of subframe 7, subframe 8 and subframe 9 if subframe 6 is configured to the PCH; or to transmit the CSI-RS in at least one of subframe 6, subframe 7, subframe 8 and subframe 9 if subframe 6 is not configured to the PCH, in the case of uplink-downlink configuration 3;

To transmit the CSI-RS in at least one of subframe 4, subframe 7, subframe 8 and subframe 9 if subframe 6 is configured to the PCH; or to transmit the CSI-RS in at least one of subframe 4, subframe 6, subframe 7, subframe 8 and subframe 9 if subframe 6 is not configured to the PCH, in the case of uplink-downlink configuration 4;

To transmit the CSI-RS in at least one of subframe 3, subframe 4, subframe 7, subframe 8 and subframe 9 if subframe 6 is configured to the PCH; or to transmit the CSI-RS in at least one of subframe 3, subframe 4, subframe 6, subframe 7, subframe 8 and subframe 9 if subframe 6 is not configured to the PCH, in the case of uplink-downlink configuration 5; and To transmit the CSI-RS in subframe 9 in the case of uplink-downlink configuration 6.

Preferably the transmission module 310 is configured to transmit the CSI-RS in subframe 4 and subframe 9 in the case of any of uplink-downlink configurations 1, 2, 4 and 5 when CSI-RS transmission cycle is 5 ms; and to transmit the CSI-RS in subframe 9 in the case of any of uplink-downlink configurations 1, 2, 3, 4, 5 and 6 when CSI-RS transmission cycle is 10 ms.

The foregoing apparatus can further include:

A notification module 320 configured to notify a user equipment of current uplink-downlink configuration and the CSI-RS transmission cycle.

The embodiment of the invention avoids conflict of CSI-RS with control information, system information and information borne in a special subframe; and the CSI-RS is transmitted in a downlink subframe at a fixed location to thereby save signaling overhead, simplify scheduling of the CSI-RS subframe and lower implementation complexity in hardware.

Figure 4:
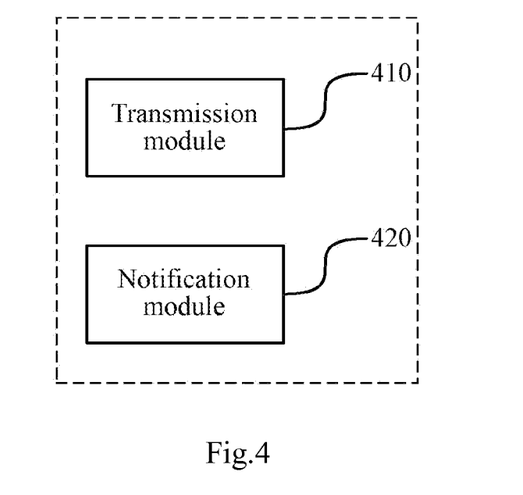
FIG. 4 is a schematic structural diagram of a CSI-RS transmission apparatus in a fourth embodiment of the invention.

As illustrated in FIG. 4 which is a schematic structural diagram of a CSI-RS transmission apparatus in a fourth embodiment of the invention, the apparatus includes:

A transmission module 410 configured to transmit CSI-RS in subframe 4 and subframe 9 in the case of any of uplink-downlink configurations 1, 2, 4 and 5 when CSI-RS transmission cycle is 5 ms; and to transmit the CSI-RS in subframe 9 in the case of any of uplink-downlink configurations 1, 2, 3, 4, 5 and 6 when the CSI-RS transmission cycle is 10 ms; and A notification module 420 configured to notify a user equipment of current uplink-downlink configuration and the CSI-RS transmission cycle.

The embodiment of the invention avoids conflict of CSI-RS with control information, system information and information borne in a special subframe; and the CSI-RS is transmitted in a downlink subframe at a fixed location to thereby save signaling overhead, simplify scheduling of the CSI-RS subframe and lower implementation complexity in hardware.

Figure 5:
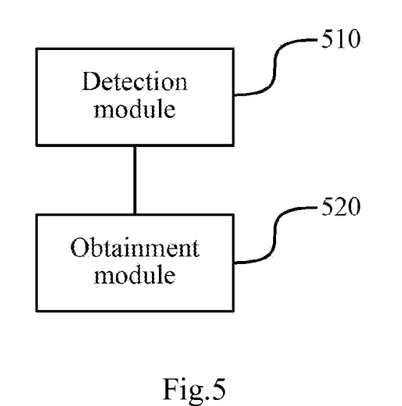
FIG. 5 is a schematic structural diagram of a CSI-RS detection apparatus in a fifth embodiment of the invention.

As illustrated in FIG. 5 which is a schematic structural diagram of a CSI-RS detection apparatus in a fifth embodiment of the invention, the apparatus includes:

A detection module 510 configured to detect CSI-RS in a downlink subframe other than special subframes, downlink subframes for transmitting control information and downlink subframes for transmitting system information.

Particularly the downlink subframes for transmitting control information can include a downlink subframe for transmitting a synchronization sequence, a downlink subframe configured to a PBCH and a downlink subframe configured to a PCH; and the downlink subframes for transmitting system information can include a downlink subframe for transmitting SIB-1.

Specifically the detection module 510 is configured to detect the CSI-RS in subframe 4 and/or subframe 9 in the case of uplink-downlink configurations 1;

To detect the CSI-RS in at least one of subframe 3, subframe 4, subframe 8 and subframe 9 in the case of uplink-downlink configuration 2;

To detect the CSI-RS in at least one of subframe 7, subframe 8 and subframe 9 if subframe 6 is configured to the PCH; or The detection module 510 is configured to detect the CSI-RS in at least one of subframe 6, subframe 7, subframe 8 and subframe 9 if subframe 6 is not configured to the PCH, in the case of uplink-downlink configuration 3;

To detect the CSI-RS in at least one of subframe 4, subframe 7, subframe 8 and subframe 9 if subframe 6 is configured to the PCH; or The detection module 510 is configured to detect the CSI-RS in at least one of subframe 4, subframe 6, subframe 7, subframe 8 and subframe 9 if subframe 6 is not configured to the PCH, in the case of uplink-downlink configuration 4;

To detect the CSI-RS in at least one of subframe 3, subframe 4, subframe 7, subframe 8 and subframe 9 if subframe 6 is configured to the PCH; or The detection module 510 is configured to detect the CSI-RS in at least one of subframe 3, subframe 4, subframe 6, subframe 7, subframe 8 and subframe 9 if subframe 6 is not configured to the PCH, in the case of uplink-downlink configuration 5; and To detect the CSI-RS in subframe 9 in the case of uplink-downlink configuration 6.

Preferably the detection module 510 is configured to detect the CSI-RS in subframe 4 and subframe 9 in the case of any of uplink-downlink configurations 1, 2, 4 and 5 when a detection cycle of the CSI-RS is 5 ms; and to detect the CSI-RS in subframe 9 in the case of any of uplink-downlink configurations 1, 2, 3, 4, 5 and 6 when CSI-RS detection cycle is 10 ms.

The foregoing apparatus can further include:

An obtainment module 520 configured to obtain current uplink-downlink configuration and the CSI-RS detection cycle for use by the detection module 510.

The embodiment of the invention avoids conflict of CSI-RS with control information, system information and information borne in a special subframe; and the CSI-RS is detected in a downlink subframe at a fixed location to thereby save signaling overhead, simplify scheduling of the CSI-RS subframe and lower implementation complexity in hardware.

Figure 6:
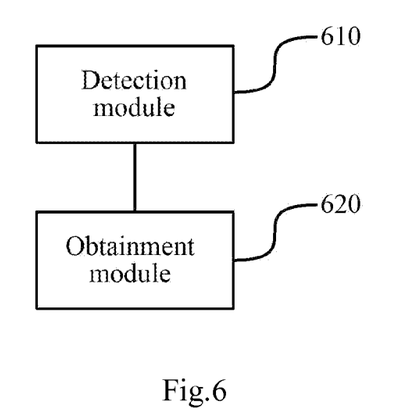
FIG. 6 is a schematic structural diagram of a CSI-RS detection apparatus in a sixth embodiment of the invention.

As illustrated in FIG. 6 which is a schematic structural diagram of a CSI-RS detection apparatus in a fourth embodiment of the invention, the apparatus includes:

A detection module 610 configured to detect CSI-RS in subframe 4 and subframe 9 in the case of any of uplink-downlink configurations 1, 2, 4 and 5 when CSI-RS detection cycle is 5 ms; and to detect the CSI-RS in subframe 9 in the case of any of uplink-downlink configurations 1, 2, 3, 4, 5 and 6 when CSI-RS detection cycle is 10 ms; and An obtainment module 620 configured to obtain current uplink-downlink configuration and the CSI-RS detection cycle for use by the detection module 610.

The embodiment of the invention avoids conflict of CSI-RS with control information, system information and information borne in a special subframe; and the CSI-RS is detected in a downlink subframe at a fixed location to thereby save signaling overhead, simplify scheduling of the CSI-RS subframe and lower implementation complexity in hardware.

Those skilled in the art can clearly appreciate from the foregoing description of the embodiments that the embodiments of the invention can be implemented in software plus a necessary general hardware platform or, of course, in hardware, although the former implementation is preferred in many cases. Based upon such understanding, the technical solutions of the embodiments of the invention in essence or the part thereof contributing to the prior art can be embodied in the form of a software product which can be stored in a storage medium and which includes several instructions to cause a terminal device (e.g., a mobile phone, a personal computer, a server, a network device, etc.) to perform the methods according to the respective embodiments of the invention.

The foregoing disclosure is merely illustrative of the preferred embodiments of the invention, and it shall be noted that those ordinarily skilled in the art can further make several modifications and variations without departing from the principle of the embodiments of the invention and that these modifications and variations shall also be construed as falling into the scope of the invention.

Those skilled in the art can appreciate that the modules in the apparatuses of the embodiments can be distributed in the apparatuses of the embodiments as described in the embodiments or located in one or more apparatuses different from those of the embodiments given corresponding variations. The modules of the foregoing embodiments can be integrated together or deployed separately or can be combined into one module or further subdivided into a plurality of sub-modules.

The embodiments of the invention have been numbered only for the sake of a convenient description but will not suggest any superiority of one embodiment to another.

The foregoing disclosure is merely illustrative of several embodiments of the invention, but the invention will not be limited thereto, and any variations that can occur to those skilled in the art shall fall into the scope of the invention.

The invention claimed is:

1. A Channel State Information-Reference Signal, CSI-RS, transmission method, comprising:
   transmitting CSI-RS in at least one downlink subframe, wherein the at least one downlink subframe excludes special subframes, downlink subframes for transmitting control information, and downlink subframes for transmitting system information;
   wherein the downlink subframes for transmitting control information comprise a downlink subframe for transmitting synchronization sequence, a downlink subframe configured to Physical Broadcast Channel, PBCH, and a downlink subframe configured to paging channel, PCH; and the downlink subframes for transmitting system information comprise a downlink subframe for transmitting System Information Block, SIB-1;
   wherein transmitting the CSI-RS in the at least one downlink subframe comprises:
   transmitting the CSI-RS in at least one of subframe 4 and subframe 9 in the case of uplink-downlink configurations 1;
   transmitting the CSI-RS in at least one of subframe 3, subframe 4, subframe 8 and subframe 9 in the case of uplink-downlink configuration 2;
   transmitting the CSI-RS in at least one of subframe 7, subframe 8 and subframe 9 in the case of uplink-downlink configuration 3 and subframe 6 configured to the PCH;
   transmitting the CSI-RS in at least one of subframe 6, subframe 7, subframe 8 and subframe 9 in the case of uplink-downlink configuration 3 and subframe 6 not configured to the PCH;
   transmitting the CSI-RS in at least one of subframe 4, subframe 7, subframe 8 and subframe 9 in the case of uplink-downlink configuration 4 and subframe 6 configured to the PCH;
   transmitting the CSI-RS in at least one of subframe 4, subframe 6, subframe 7, subframe 8 and subframe 9 in the case of uplink-downlink configuration 4 and subframe 6 not configured to the PCH;
   transmitting the CSI-RS in at least one of subframe 3, subframe 4, subframe 7, subframe 8 and subframe 9 in the case of uplink-downlink configuration 5 and subframe 6 configured to the PCH;
   transmitting the CSI-RS in at least one of subframe 3, subframe 4, subframe 6, subframe 7, subframe 8 and subframe 9 in the case of uplink-downlink configuration 5 and subframe 6 not configured to the PCH; and
   transmitting the CSI-RS in subframe 9 in the case of uplink-downlink configuration 6.

2. The method according to claim 1, wherein transmitting the CSI-RS in the at least one downlink subframe comprises:
   transmitting the CSI-RS in subframe 4 and subframe 9 in the case of any of uplink-downlink configurations 1, 2, 4 and 5 when CSI-RS transmission cycle is 5 ms; and
   transmitting the CSI-RS in subframe 9 in the case of any of uplink-downlink configurations 1, 2, 3, 4, 5 and 6 when the CSI-RS transmission cycle is 10 ms.

3. The method according to claim 2, further comprising:
   notifying a user equipment of current uplink-downlink configuration and the CSI-RS transmission cycle.

4. A Channel State Information-Reference Signal, CSI-RS, transmission apparatus, comprising a processor, and a memory coupled to the processor, wherein:
   the memory stores instructions that, when executed by the processor, cause the apparatus to transmit CSI-RS in at least one downlink subframe, wherein the at least one downlink subframe excludes special subframes, downlink subframes for transmitting control information, and downlink subframes for transmitting system information;
   wherein the downlink subframes for transmitting control information comprise a downlink subframe for transmitting synchronization sequence, a downlink subframe configured to Physical Broadcast Channel, PBCH, and a downlink subframe configured to paging channel, PCH; and the downlink subframes for transmitting system information comprise a downlink subframe for transmitting System Information Block, SIB-1;
   wherein the instructions, when executed by the processor, cause the apparatus to transmit the CSI-RS in at least one of subframe 4 and subframe 9 in the case of uplink-downlink configurations 1;
   to transmit the CSI-RS in at least one of subframe 3, subframe 4, subframe 8 and subframe 9 in the case of uplink-downlink configuration 2;
   to transmit the CSI-RS in at least one of subframe 7, subframe 8 and subframe 9 in the case of uplink-downlink configuration 3 and subframe 6 configured to the PCH;
   to transmit the CSI-RS in at least one of subframe 6, subframe 7, subframe 8 and subframe 9 in the case of uplink-downlink configuration 3 and subframe 6 not configured to the PCH;
   to transmit the CSI-RS in at least one of subframe 4, subframe 7, subframe 8 and subframe 9 in the case of uplink-downlink configuration 4 and subframe 6 configured to the PCH;
   to transmit the CSI-RS in at least one of subframe 4, subframe 6, subframe 7, subframe 8 and subframe 9 in the case of uplink-downlink configuration 4 and subframe 6 not configured to the PCH;
   to transmit the CSI-RS in at least one of subframe 3, subframe 4, subframe 7, subframe 8 and subframe 9 in the case of uplink-downlink configuration 5 and subframe 6 configured to the PCH;

to transmit the CSI-RS in at least one of subframe 3, subframe 4, subframe 6, subframe 7, subframe 8 and subframe 9 in the case of uplink-downlink configuration 5 and subframe 6 not configured to the PCH; and to transmit the CSI-RS in subframe 9 in the case of uplink-downlink configuration 6.

5. The apparatus according to claim 4, wherein:
the instructions, when executed by the processor, cause the apparatus to transmit the CSI-RS in subframe 4 and subframe 9 in the case of any of uplink-downlink configurations 1, 2, 4 and 5 when CSI-RS transmission cycle is 5 ms; and to transmit the CSI-RS in subframe 9 in the case of any of uplink-downlink configurations 1, 2, 3, 4, 5 and 6 when the CSI-RS transmission cycle is 10 ms.

6. The apparatus according to claim 5, wherein
the memory further stores instructions that, when executed by the processor, cause the apparatus to notify a user equipment of current uplink-downlink configuration and the CSI-RS transmission cycle.

7. A Channel State Information-Reference Signal, CSI-RS, detection method, comprising:
detecting CSI-RS in at least one downlink subframe, wherein the at least one downlink subframe excludes special subframes, downlink subframes for transmitting control information, and downlink subframes for transmitting system information;
wherein the downlink subframes for transmitting control information comprise a downlink subframe for transmitting synchronization sequence, a downlink subframe configured to Physical Broadcast Channel, PBCH, and a downlink subframe configured to paging channel, PCH; and the downlink subframes for transmitting system information comprise a downlink subframe for transmitting System Information Block, SIB-1;
wherein detecting the CSI-RS in the at least one downlink subframe comprises:
detecting the CSI-RS in at least one of subframe 4 and subframe 9 in the case of uplink-downlink configurations 1;
detecting the CSI-RS in at least one of subframe 3, subframe 4, subframe 8 and subframe 9 in the case of uplink-downlink configuration 2;
detecting the CSI-RS in at least one of subframe 7, subframe 8 and subframe 9 in the case of uplink-downlink configuration 3 and subframe 6 configured to the PCH;
detecting the CSI-RS in at least one of subframe 6, subframe 7, subframe 8 and subframe 9 in the case of uplink-downlink configuration 3 and subframe 6 not configured to the PCH;
detecting the CSI-RS in at least one of subframe 4, subframe 7, subframe 8 and subframe 9 in the case of uplink-downlink configuration 4 and subframe 6 configured to the PCH;
detecting the CSI-RS in at least one of subframe 4, subframe 6, subframe 7, subframe 8 and subframe 9 in the case of uplink-downlink configuration 4 and subframe 6 not configured to the PCH;
detecting the CSI-RS in at least one of subframe 3, subframe 4, subframe 7, subframe 8 and subframe 9 in the case of uplink-downlink configuration 5 and subframe 6 configured to the PCH;
detecting the CSI-RS in at least one of subframe 3, subframe 4, subframe 6, subframe 7, subframe 8 and subframe 9 in the case of uplink-downlink configuration 5 and subframe 6 not configured to the PCH; and
detecting the CSI-RS in subframe 9 in the case of uplink-downlink configuration 6.

8. The method according to claim 7, wherein detecting the CSI-RS in the at least one downlink subframe comprises:
detecting the CSI-RS in subframe 4 and subframe 9 in the case of any of uplink-downlink configurations 1, 2, 4 and 5 when CSI-RS detection cycle is 5 ms; and
detecting the CSI-RS in subframe 9 in the case of any of uplink-downlink configurations 1, 2, 3, 4, 5 and 6 when CSI-RS detection cycle is 10 ms.

9. The method according to claim 8, further comprising:
obtaining a user equipment of current uplink-downlink configuration and the CSI-RS detection cycle.

10. A Channel State Information-Reference Signal, CSI-RS, detection apparatus, comprising a processor, and a memory coupled to the processor, wherein:
the memory stores instructions that, when executed by the processor, cause the apparatus to detect CSI-RS in at least one downlink subframe, wherein the at least one downlink subframe excludes special subframes, downlink subframes for transmitting control information, and downlink subframes for transmitting system information;
wherein the downlink subframes for transmitting control information comprise a downlink subframe for transmitting synchronization sequence, a downlink subframe configured to Physical Broadcast Channel, PBCH, and a downlink subframe configured to paging channel, PCH; and the downlink subframes for transmitting system information comprise a downlink subframe for transmitting System Information Block, SIB-1;
wherein the instructions, when executed by the processor, cause the apparatus to detect the CSI-RS in at least one of subframe 4 and subframe 9 in the case of uplink-downlink configurations 1;
to detect the CSI-RS in at least one of subframe 3, subframe 4, subframe 8 and subframe 9 in the case of uplink-downlink configuration 2;
to detect the CSI-RS in at least one of subframe 7, subframe 8 and subframe 9 in the case of uplink-downlink configuration 3 and subframe 6 configured to the PCH;
to detect the CSI-RS in at least one of subframe 6, subframe 7, subframe 8 and subframe 9 in the case of uplink-downlink configuration 3 and subframe 6 not configured to the PCH;
to detect the CSI-RS in at least one of subframe 4, subframe 7, subframe 8 and subframe 9 in the case of uplink-downlink configuration 4 and subframe 6 configured to the PCH;
to detect the CSI-RS in at least one of subframe 4, subframe 6, subframe 7, subframe 8 and subframe 9 in the case of uplink-downlink configuration 4 and subframe 6 not configured to the PCH;
to detect the CSI-RS in at least one of subframe 3, subframe 4, subframe 7, subframe 8 and subframe 9 in the case of uplink-downlink configuration 5 and subframe 6 configured to the PCH;
to detect the CSI-RS in at least one of subframe 3, subframe 4, subframe 6, subframe 7, subframe 8 and subframe 9 in the case of uplink-downlink configuration 5 and subframe 6 not configured to the PCH; and
to detect the CSI-RS in subframe 9 in the case of uplink-downlink configuration 6.

11. The apparatus according to claim 10, wherein:
the instructions, when executed by the processor, cause the apparatus to detect the CSI-RS in subframe 4 and subframe 9 in the case of any of uplink-downlink configurations 1, 2, 4 and 5 when CSI-RS detection cycle is 5 ms; and
to detect the CSI-RS in subframe 9 in the case of any of uplink-downlink configurations 1, 2, 3, 4, 5 and 6 when CSI-RS detection cycle is 10 ms.

12. The apparatus according to claim 11, wherein:
the memory further stores instructions that, when executed by the processor, cause the apparatus to obtain a user equipment of current uplink-downlink configuration and the CSI-RS detection cycle.

\* \* \* \* \*